United States Patent
Marty et al.

(10) Patent No.: US 9,145,986 B2
(45) Date of Patent: Sep. 29, 2015

(54) WIRING SUPPORT FOR AIRCRAFT

(71) Applicant: AIRBUS OPERATIONS (SAS), Toulouse (FR)

(72) Inventors: Olivier Marty, Verdun sur Garonne (FR); Davide Faggella, Toulouse (FR); Benjamin Lafont, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 56 days.

(21) Appl. No.: 13/947,365

(22) Filed: Jul. 22, 2013

(65) Prior Publication Data

US 2014/0021310 A1    Jan. 23, 2014

(30) Foreign Application Priority Data

Jul. 23, 2012  (FR) ...................................... 12 57120

(51) Int. Cl.
*F16L 3/00* (2006.01)
*F16L 3/22* (2006.01)
*H02G 3/32* (2006.01)

(52) U.S. Cl.
CPC ... *F16L 3/22* (2013.01); *H02G 3/32* (2013.01)

(58) Field of Classification Search
CPC ............... F16L 3/22; F16L 3/26; H02G 3/04; H02G 3/22
See application file for complete search history.

(56) References Cited

U.S. PATENT DOCUMENTS

| 2,560,845 | A | * | 7/1951 | Carpenter et al. | ............... 248/58 |
| 4,957,251 | A | * | 9/1990 | Hubbard | ...................... 248/68.1 |
| 5,918,837 | A | * | 7/1999 | Vicain | .............. 248/49 |
| 8,936,221 | B2 | * | 1/2015 | Rouleau et al. | ................. 248/73 |
| 2001/0019094 | A1 | | 9/2001 | Koziol | |
| 2007/0290100 | A1 | * | 12/2007 | Caveney | ...................... 248/74.3 |
| 2011/0108699 | A1 | * | 5/2011 | Komaro et al. | .............. 248/636 |

FOREIGN PATENT DOCUMENTS

EP       1 133 039       9/2001
WO    WO 2005/106304    11/2005

OTHER PUBLICATIONS

Search Report for FR 20120057120 dated Mar. 6, 2013.

* cited by examiner

*Primary Examiner* — Amy Sterling
(74) *Attorney, Agent, or Firm* — Nixon & Vanderhye P.C.

(57) ABSTRACT

The support (1) comprises a main body (3) which has a convex shape comprising facets which are planar and curved and free of edges, and it is provided with main contact surfaces (5) each of which is able to accept an electric cable, and with openings (6) surrounding each of the main contact surfaces (5).

13 Claims, 2 Drawing Sheets

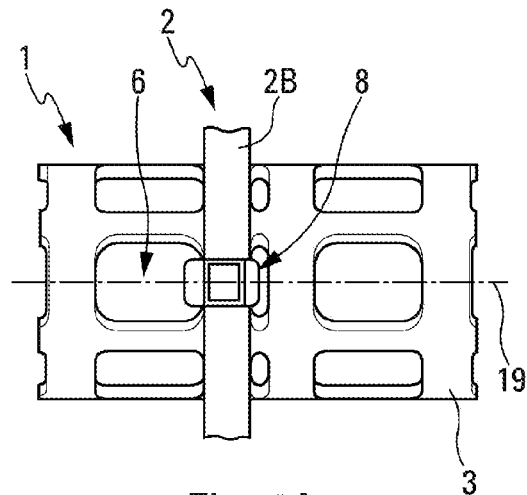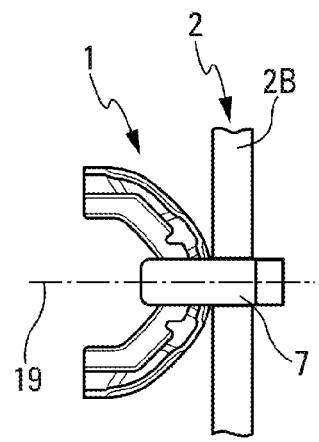
Fig. 4A  Fig. 4B
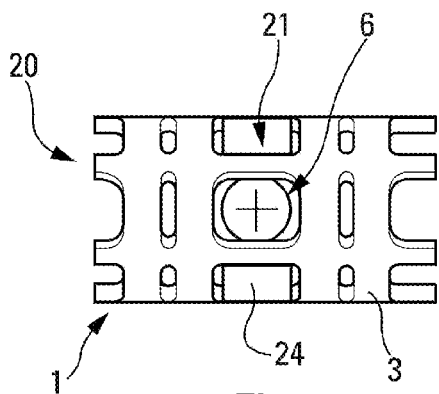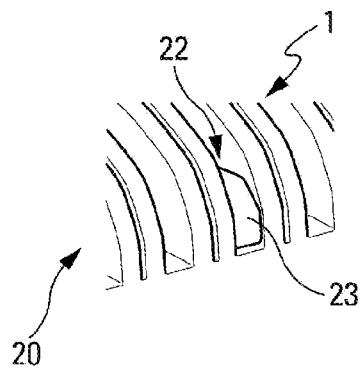
Fig. 5  Fig. 6
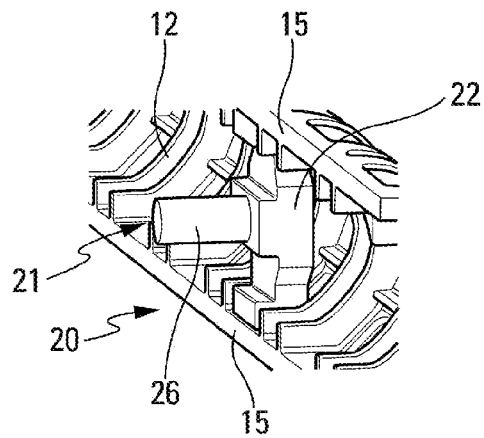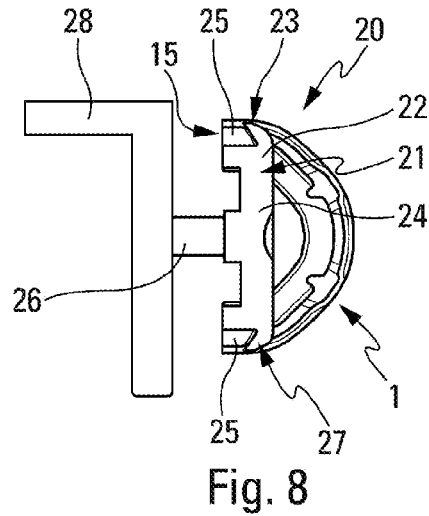
Fig. 7  Fig. 8

WIRING SUPPORT FOR AIRCRAFT

This application claims priority to French Patent Application No. 20120057120 filed Jul. 20, 2013, the entire contents of which are hereby incorporated by reference.

BACKGROUND OF THE INVENTION

1. Field of the Invention

The present invention relates to a wiring support for an aircraft.

2. Discussion of Prior Art

In general, such a support comprises a main body of elongate shape, which is provided with a first face able to be fixed to a structural element of the aircraft and with a second face to which electric cables can be attached. The present invention relates to a support which mainly (although not exclusively) allows the electric cables to be attached orthogonally. In addition, in the context of the present invention, the support is intended to support any type of electric cable used in the aeronautical field, namely both a metal wire inside a protective sheath and, more frequently, a loom of sheathed electric wires, and to do so irrespective of the size and function of the electric cable.

In general, such a support (for supporting electric cable installation), for example of rectangular transverse surface, requires the use of at least one intermediate component in order to be able to fix a cable to the support without damaging this cable. Such a conventional support requires the addition of intermediate elements (nuts and bolts, spacer pieces etc.), because of the sharp edges on its profile, which carry a risk of rubbing against the electric cables and therefore of damaging them. This compulsory addition of intermediate elements has an impact on the cost of the installation, installation time, the final weight of the installation, a risk of loss of a point of attachment, and flexibility (as a support and with respect to the fixing).

Also known is a support which is obtained by assembling various primary elements. These primary elements may be end-pieces, supporting pieces, for example V-shaped ones (for guiding the cable), couplings, support portions, bends, etc. These elements are preselected according to the design adopted for the final support, and are then manufactured before being assembled.

As a result, having received all of the primary elements that will make up the support (end-pieces, supporting pieces, support sections, couplings, etc.), all these elements have to undergo a (bonded) assembly operation. This has a considerable impact on industrialization costs (proliferation of tooling, low quantities of the various elements, etc.).

This latter approach also displays other disadvantages such as a fixed configuration in which the cables are positioned, because the design of the support is connected directly with where the point of attachment is positioned on the structure or where the loading is applied to the support, the design will not be the same from one installation to another, and reduced load bearing capability.

It is an object of the present invention to rectify these disadvantages.

SUMMARY OF THE INVENTION

The invention relates to a support for aircraft wiring, of the type comprising a main body of elongate shape, which is made as a single piece, and provided with an internal face able to be fixed to a structural element of the aircraft and with an external face able to accept at least one electric cable, which support offers numerous advantages and notably does not require any intermediate component for electric cable(s) attachment without the risk of cable damage.

To this end, according to the invention, the support is notable in that the main body has a convex shape on the external face and includes facets which are planar and curved and free of (sharp) edges, having in the transverse direction the overall shape of an arc of a circle; and is provided with main contact surfaces on the external face, each of which surfaces is able to accept one electric cable, and with openings surrounding each of the contact surfaces, which are notably intended for attaching the electric cable to the support.

Thus, by virtue of the invention, and notably by virtue of the convex shape free of edges (notably sharp edges), the support can support electric cables directly, which means to say without the use of intermediate components for connecting the cable or cables to the support, and without the risk of damage to the electric cable or cables used.

This then notably yields the advantages of a saving of weight on the installation, with an improvement in the weight/load ratio and a saving of time in installing the electric cables.

Furthermore, advantageously, the main body is formed of a series of directly adjacent motifs which are reproduced in succession along the main body. Each motif comprises, in the longitudinal direction, the series of parts such as a first half-zone of at least one first hole, a first contact-surface half-zone, a central zone comprising at least one second hole which is wider than the first hole, a second contact-surface half-zone, and a second first-hole half-zone. The first contact-surface half-zone of one motif being able to form a main contact surface with a second contact-surface half-zone belonging to an immediately adjacent motif.

By virtue notably of these last features (a repeating identical motif), the solution becomes universal as far as installation scenarios are concerned and the solution becomes modular in terms of how it is fixed and used.

Moreover, advantageously, to improve the rigidity of the support, the main body is provided, on the internal face of each second contact-surface half-zone, with a transverse stiffening rib, and/or the main body comprises two longitudinal strips of continuous material, one on each side of a central longitudinal part, and is provided on the internal face of each of these two strips with a longitudinal stiffening rib.

Further, advantageously, the main body comprises, at each of the two ends of the overall circular-arc shape, a longitudinal contact heel. This allows the support to be fixed easily and in a stable manner to a structural element of the aircraft, as specified hereinbelow.

Moreover, advantageously, the first and second first-hole half-zones each comprise a plurality of first holes, so as to be able to form holed zones to make the support easy to cut to length.

Furthermore, advantageously, the main body comprises two longitudinal strips of continuous material, one on each side of a central part, and, longitudinally in the region of each central zone, transversely on the opposite side to the second hole, towards each end of the main body, a third hole which (in the transverse direction) is not as wide as the second hole. In addition to its ability to guide or route in the transverse direction, which is its main objective, the support according to the invention thus also allows an electric cable to be routed in the longitudinal direction along at least one of the longitudinal strips, with the electric cable attached using dedicated holes.

Moreover, in one preferred embodiment, the support is provided with a silicone skin which covers the entire external surface of the main body, and is punctuated at holes (referred to as active holes) of the main body, which are intended to be used for electric cable(s) attachment.

The function of this silicone skin is twofold—on the one hand, it safeguards the electric cable or cables, by preventing any damaging rubbing against the support; and on the other hand, it provides a visible indicator for the purposes of installing or reinstalling the support, for maintenance or replacement operations, by ensuring that the holes that are not used are obstructed (because only the active holes are punctuated) and therefore inaccessible.

Furthermore, advantageously, the skin is provided only with a cross-shaped cut at the holes which is simply and solely intended to assist with the fixing of fixing means, as specified hereinbelow.

The present invention thus allows a reduction in the number of fitting operations, a reduction in the number of parts; and a reduction in weight, and does so with a minor impact on the direct environment (very small variations in the positions of the cables and supports by comparison with a conventional support).

The present invention also relates to a support system for supporting aircraft wiring, of the type comprising: a support which comprises a main body of elongate shape, made as a single piece, and provided with an internal face able to be fixed to a structural element of the aircraft and with an external face able to accept at least one electric cable; and fixing means for fixing the support to a structural element.

According to the invention, the support system comprises a support of the kind mentioned hereinabove.

Furthermore, advantageously, the fixing means comprise elements of which the ends are intended to press against protruding flanges of the internal face of the support and of which a central opening is intended to allow for fixing to a structural element of the aircraft. For preference, the contact zones for contact between the ends of the upper branch and the protruding flanges are inclined so as to dictate the direction of the clamping forces.

Thus, according to the present invention the support is designed to be used without any intermediate component being fitted between it and the electric cables (notably to protect the cables), only attachment means such as a cable-tie being provided. The shape of the support is independent of the use scenario, making it simple to industrialize (single design) and it offers great flexibility to evolve how it is used. Specifically, it allows multiple combinations of electric cable positioning, the only restriction being its geometric characteristics coupled with electric safety rules; and it offers great flexibility in the positioning of the fixing means on a structural element of the aircraft.

BRIEF DESCRIPTION OF THE DRAWINGS

The figures of the attached drawing will make it easy to understand how the invention may be embodied. In these figures, identical references denote similar elements.

FIGS. 4A and 4B are views similar to those of FIGS. 3A and 3B with a thinner electric cable.

FIGS. 5 to 8 depict various views showing a fixing means positioned on a portion of support.

DETAILED DISCUSSION OF EMBODIMENTS

Figure 1:
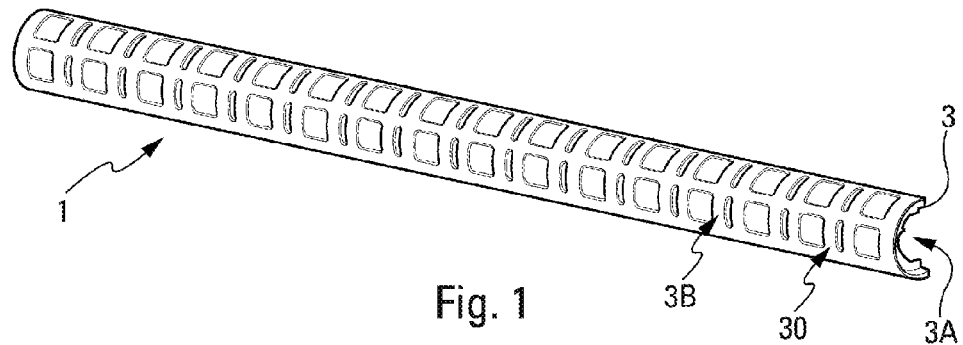
FIG. 1 is a perspective view of a support according to the invention.

The support 1 according to the invention and depicted in FIG. 1 is intended to support electric cables 2 (thick cables 2A or thin cables 2B) on an aircraft (not depicted), particularly a transport plane.

In general, this support 1 comprises a main body 3 of elongate shape. The support is provided with an internal face 3A which is able to be fixed to a usual structural element 28 of the aircraft, for example an interior surface of the fuselage. This internal face 3A represents the internal face of the main body 3; and with an external face 3B to which one or generally several electric cables 2 can be attached. This external face 3B of the support 1 represents the outer face of the main body 3 or, in a preferred embodiment, the external face of a skin 30 which is arranged over the outer face of the main body 3, as specified hereinbelow.

Figure 3A:
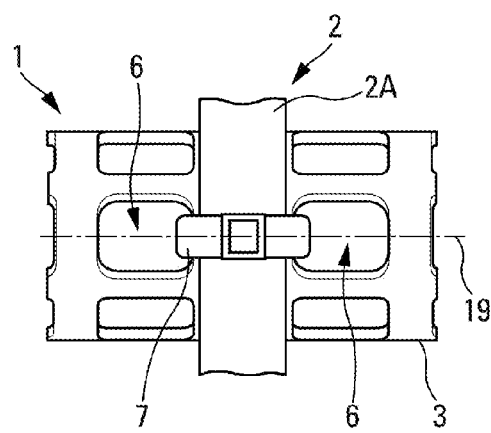
FIGS. 3A and 3B are respectively face-on and transverse views of a portion of support to which a thick electric cable is attached.
Figure 3B:
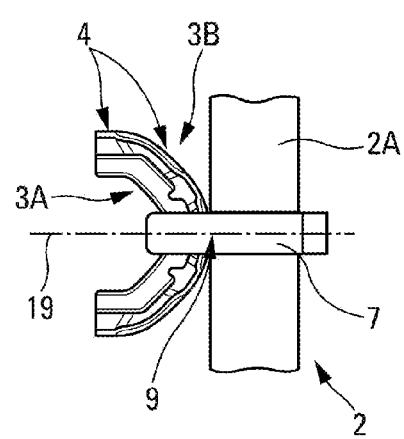

According to the invention, the main body 3 of the support 1 has a convex shape on the external face; comprises facets 4 which are planar and curved, free of (sharp) edges, and which transversely have the overall shape of an arc of a circle (of plane of symmetry 19), as depicted for example in FIGS. 3B and 4B. The body 3 is provided with main contact surfaces 5 on the external face 3B, each of which surfaces is able to accept an electric cable 2, and with openings 6 surrounding each of the contact surfaces 5 and intended for the passage of attachment means (such as cable-tie 7) for the electric cable 2 attachment.

Thus, by virtue of this convex shape free of (notably sharp) edges, the support 1 is able to support electric cable(s) 2 directly, without the use of intermediate components (positioned between the support 1 and the cable(s) 2) to accept the cable(s) 2 (with the exception of the means 7 intended for attachment), and does so without the risk of damaging the electric cable(s) 2 provided.

At a contact surface 5, a cable 2 is in contact with the support 1 along a contact line 9 which, by deforming of the cable 2, will become a convex contact surface. Using the invention also affords the following advantages over conventional supports—a weight saving on the installation, with an improvement to the weight-of-installation/load ratio; and a saving of time taken to install the electric cables 2.

Figures 2A, 2B:
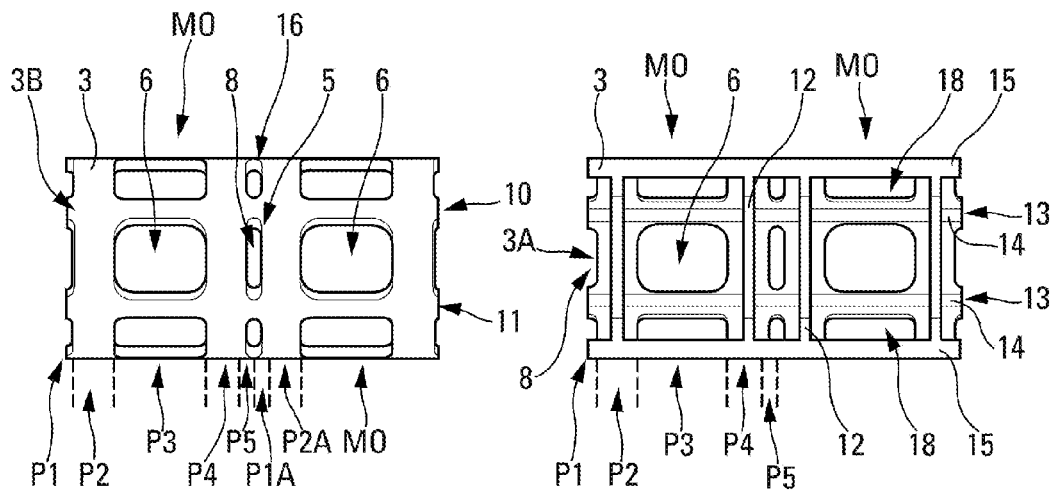
FIGS. 2A and 2B respectively show the external face and the internal face of a portion of a main body of a support according to the invention, comprising two successive motifs.

In a preferred embodiment, the main body 3 is formed of a series of motifs M0 which are reproduced in succession along the main body 3, being directly connected to one another. The portions of support depicted in FIGS. 2A and 2B each comprise two of these motifs M0 immediately adjacent to one another. Each motif M0 comprises, in the longitudinal direction, as depicted in FIGS. 2A and 2B, the series of parts including a first half-zone P1 of first (half-) holes (or openings) 8, a first contact-surface half-zone P2, and a central zone P3 comprising at least one second hole (or opening) 6 which is wider (in the longitudinal direction of the support 1) than the first holes 8. The motif M0 also includes a second contact-surface half-zone P4, similar to the first half-zone P2; and a second half-zone P5 of first (half-) holes 8, which is similar to the first half-zone P1.

A first and a second half-zone P4 and P5 which are adjacent and belong to one motif M0 are able, with a first and a second half-zone P1A and P2A which are adjacent and belong to an immediately adjacent motif, to form a main contact surface 5, as illustrated in FIG. 2A. The zones P1A and P2A are identical to the zones P1 and P2, the letters A and B have simply been added to the P1A and the P2A in FIG. 2A to make it clear that these zones P1A and P2A form part of a motif M0 different from P1 and P2.

More specifically the arrangement, by repeating the motif M0, creates, at each point where motifs (for example P5 and P1A in FIG. 2A) meet, a zone 15 of narrow holes 8. The function of the zone 15 is specified hereinbelow. The repeating of two contact half-zones P4 and P2A makes it possible to create a wide contact zone (surface 5).

By virtue notably of these last features (and in particular of the repeating of an identical motif M0), the solution according to the invention becomes universal with respect to installation scenarios and this solution becomes modular in terms of its fixing and use.

The support 1, for example of the order of 700 mm long, is therefore designed as a repeat of a motif M0 which is, for example, of the order of one inch (approximately 25.4 mm) long. The support 1 has three active surfaces—a frontal surface (main contact surface 5); and two inclined lateral surfaces 10 and 11 specified hereinbelow, all of which are situated on the external face 3B of the support 1. The contact between the electric cables 2 and these active surfaces 5, 10 and 11 is curved-to-curved surface contact.

The various parts of a motif M0 are intended in the case of the half-zones P1 and P5, for the passage of attachment means (such as a cable-tie 7), in the case of the half-zones P2 and P4, for contact with the electric cables 2; and in the case of the central zone P3, for the passage of attachment means, such as cable-tie 7.

As depicted in FIGS. 3A and 3B, the support 1 can be used to attach a thick cable 2A which is in contact with the main active surface 5 formed by the parts P4, P5, P1A and P2A of FIG. 2A. In this case, the cable-tie 7 passes through the wide holes 6 (of central zones P3) of two successive motifs.

Furthermore, as depicted in FIGS. 4A and 4B, the support 1 can be used to attach a thin cable 2B which is in contact with the surface formed only by the part P4 in FIG. 2A. In this case, the cable-tie 7 passes, on the one hand, through the wide hole 6 (of the adjacent central zone P3) and, on the other hand, through the hole 8 formed of the two parts P5 and P1A of FIG. 2A.

As a result, aside from the main openings 6 through which to pass the cable-ties 7, the support 1 also offers the possibility of holding electric cables 2B of small diameters (from 5 to 10 mm) using an additional opening 8 formed by adjacent parts P5 and P1A.

The support 1 therefore offers numerous combinations for the passage of the cable-ties 7 (main opening 6/main opening 6; main opening 6/secondary opening 8; secondary opening 8/secondary opening 8; passage through non-successive main openings 6, etc.) guaranteeing that the cables can be optimally positioned.

Thus, according to the present invention the support 1 is designed to be used without the addition of any intermediate component between it and the electric cables 2, and the shape of the support 1 is independent of the use, making it very simple to industrialize (single design). Moreover, it offers great flexibility in evolving its use. Specifically, it allows numerous combinations of positions of electric cables 2, the only restriction being its geometric characteristics coupled with electrical safety rules. Specifically, two parallel electric cables 2 have to be positioned observing a minimum separation and ensuring that the cables 2 are positioned on the active faces of the support 1.

The present invention offers great flexibility in the positioning of the fixing means, wherein the main body 3 additionally comprises two longitudinal strips 13 of continuous material on the internal face 3A, with a strip on each side of a central longitudinal part. Further at each central zone P3, a hole 18 is provided in the main body 3 and between adjacent holes 6. The hole 18 is, in the transverse direction, not as wide as the hole 6. The lateral strips 13 are reinforcing ribs to provide rigidity to the support 1, which is especially useful when the cable 2 is routed longitudinally on the support 1. The cable 2 in this case rests on lateral surfaces 10 and 11 which are on the external face 3B of the support 1. The upper/lower openings 18 and central openings 6 are used for a cable-tie 7 to pass through.

Aside from its ability to guide or route in the transverse direction, which is its prime objective, the support 1 according to the invention thus also allows for longitudinal routing along at least one of the longitudinal strips 13, with an electric cable 2 being fixed by a cable-tie 7 using adjacent holes 18 and 6.

Moreover, to improve the rigidity of the support 1, as depicted in FIG. 2B, the main body 3 is provided on the internal face of each contact-surface half-zone P2, P4, with a transverse stiffening rib 12; and on the internal face of each of the two strips 13, with a longitudinal stiffening rib 14.

In order to meet a maximum number of possible installation scenarios, and in order to minimize the tooling and production of different component forms, the support 1 can be cut to length, at each motif M0, with the possibility of cutting in the zone 16, making it possible to obtain different lengths from one and the same single model of support. The support 1 therefore retains maximum rigidity thanks to the transverse ribs 12 around the holes 6 and thanks to the presence of a transverse rib 12 at each end of the support 1 once the latter has been cut to length (along the holes 8 of the zone 16).

The useful zones on the internal face 3A of the motif M0 are made of the ribs 12 and 14 which are designed to increase the moment of inertia of the profile and therefore the mechanical integrity thereof. They run longitudinally (longitudinal ribs 14) and transversally (transverse ribs 12) to guarantee the mechanical integrity particularly when the support 1 is cut to length; and two heels 15 each of which offers a zone of contact with a structural element 28 of the aircraft, so that the support 1 can be fixed thereto.

These longitudinal contact heels 15 are provided at each end of the overall circular-arc shape. They allow the support to be fixed easily and in a stable fashion to a structural element 28 of the aircraft.

The present invention also relates to a support system 20 for supporting aircraft wiring 2, of the type comprising: a support 1 as mentioned hereinabove; and fixing means 21 for fixing the support 1 to a conventional structural element 28 (depicted schematically in FIG. 8) of the aircraft, particularly a fuselage internal part or a carrier connected to the fuselage.

This system 20 is depicted in part (in different views) in FIGS. 5 to 8. As can be seen in FIGS. 7 and 8, a fixing means 21 comprises an element 22 of elongate shape 24, its ends 23 being intended to bear against a protruding flange 25 of the internal face 3A of the main body 3 of the support 1 (at the heel 15). A central opening in the element 22 (through which opening a screw 26 visible in FIGS. 7 and 8 passes) is intended to allow the element to be secured to the structural element 28 using this screw 26.

FIG. 5 shows that a fixing means 21 can be positioned at each motif M0 in the central zone P3 and that the screw is tightened from the front of the support 1 with the possibility of passing a screwdriver through the wide passage holes 6 (whereas the fixing means 2 is put in position from the rear of the support 1).

As FIG. 6 shows, the means 21 of fixing the support 1 do not protrude beyond the active faces. This makes it possible to guarantee that there will be no sharp edges in the active zones.

Each contact zone 27, providing contact between an end 23 and a flange 25, is inclined, for example by 15°, in order to dictate the direction of the clamping forces (and direct these forces towards the centre of the support 1 and the axis of the screw).

In addition, the contact zones for contact between the support 1 and the structural element 28 are confined to the two heels 15 of the support 1 (the faces of the rear fixings being set back slightly) to guarantee good clamping.

Moreover, in one preferred embodiment, the support 1 is provided with a silicone skin 30, as depicted in FIG. 1. According to the invention, this skin 30 covers the entire exterior surface of the main body 3 and is punctuated at holes in the main body 3, which are intended to be used to support electric cables 2, mainly for the passage of cable-tie 7.

The function of this silicone skin 30 is twofold. On the one hand, the skin 30 safeguards the electric cables 2 by preventing any damaging rubbing against the support 1, and, on the other hand, provides a visible indication during installation or reinstallation of the support 1, for maintenance or replacement operations, by ensuring that the holes that are not used are obstructed and therefore inaccessible.

Furthermore, the skin 30 is provided only with a cross-shaped cut (not depicted) at the holes intended to assist with the fixing of the fixing means 21, to allow a screwdriver to pass through them without having to remove some of the skin 30 at this point. This notably assists an operator in fitting or refitting the support 1 on the aircraft.

The main body 3 with the aforementioned characteristics is produced by moulding in a plastics material, preferably a glass-fibre-reinforced polyamide, and the silicone skin 30 is created by overmoulding.

The technological modification obtained by the present invention entails replacing a conventional support with the support 1 and the removal of the customary intermediate supporting elements and all of the associated nuts and bolts and fittings, thus affording the aforementioned advantages. Fixing means 21 for fixing the support 1 to a structural element 28 are retained. The results are a reduction in the number of fitting operations, a reduction in the number of parts, a reduction in weight, and a minor impact on the environment (small variations in the positions of the cables and supporting elements).

Various amendments and variations in the above disclosed invention will be readily apparent to those of ordinary skill in the art. As a result, the invention is limited only by the limitations set out in the attached claims.

The invention claimed is:

1. A support for wiring of an aircraft, the support comprising a single piece main body of elongate shape extending in a longitudinal direction, said main body including:
   an internal face configured to be connectable to a structural element of the aircraft;
   an external face configured to accept at least one electric cable, wherein said main body has a substantially convex shape on said external face, said external face includes repeating external pattern, said pattern including a plurality of facets, said facets are connected by convex sections, wherein a transverse section of said external face comprises said facets joined by said convex sections in the overall shape of an arc of a circle with a first set of openings separating said facets;
   a plurality of main contact surfaces and openings in the external face, said contact surfaces and openings located in a repeating pattern both longitudinally and transversely on said surface, wherein a main contact surface separates at least two openings in said external face, each of said main contact surfaces is configured to accept one electric cable adjacent said contact surface and a cable tie extends through adjacent openings to secure said cable.

2. The support according to claim 1, wherein the main body facets, contact surfaces and openings are formed in a series of adjacent motifs which are reproduced in succession along the main body, and each motif comprises, in the longitudinal direction, the series of parts as follows:
   a first half-zone of at least one first hole;
   a first contact-surface half-zone;
   a central zone comprising at least one second hole which is wider than the first hole;
   a second contact-surface half-zone; and
   a second first-hole half-zone, a first contact-surface half-zone of one motif being able to form a main contact surface with a second contact-surface half-zone belonging to an immediately adjacent motif.

3. The support according to claim 2, wherein the main body is provided, on an internal face of each second contact-surface half-zone, with a transverse stiffening rib.

4. The support according to claim 2, wherein the main body comprises two longitudinal strips of continuous material, one on each side of a central longitudinal part, and is provided on the internal face of each of these two strips with a longitudinal stiffening rib.

5. The support according to claim 2, wherein the main body comprises, at each of the two ends of the overall circular-arc shape, a longitudinal contact heel.

6. The support according to claim 2, wherein the first and second first-hole half-zones each comprise a plurality of first holes.

7. The support according to claim 2, wherein the main body comprises two longitudinal strips of continuous material, one on each side of a central longitudinal part, and, longitudinally in the region of central zones, transversely on the opposite side to a second hole of the central zone, towards each end of the main body, a third hole which, in the transverse direction, is not as wide as the second hole.

8. The support according to claim 1, wherein a silicone skin covers the entire external surface of the main body, and is punctuated with holes at the openings permitting electric cable attachment.

9. The support according to claim 8, wherein the skin is provided only with a cross-shaped cut at each opening which receives a fastener fixing the main body to the structural element.

10. A support system for supporting wiring of an aircraft, the support system comprising:
   a support including:
      a single main body extending in a longitudinal direction, said main body including an internal face and an external face, wherein the internal face is configured to be connectable to a structural element of the aircraft and the external face is configured to receive an electric cable and wherein the single main body has a substantially convex shape on the external face;
      the external face includes a repeating external pattern wherein the pattern includes facets connected by convex sections,
      a transverse section of the external face includes the facets joined by the convex sections in an overall shape of an arc of a circle with a first set of openings separating the facets; and main contact surfaces and openings in the external face, said contact surfaces and openings are located in a repeating pattern both longitudinally and transversely on said surface, wherein a main contact surface separates at least two openings in said external face, each of said main contact surfaces is configured to accept one electric cable adjacent said contact surface and a cable tie extends through adjacent openings to secure said cable, and a fastener configured to fix the support to a structural element of the aircraft.

11. The support system according to claim 10, wherein the fastener includes elements having ends where the ends press against protruding flanges of the internal face of the main body of the support and of which a central opening.

12. The support system according to claim 11, wherein contact zones for contact between ends of an upper branch and the protruding flanges are inclined so as to dictate the direction of clamping forces.

13. A wiring support in an aircraft comprising:

a single main body extending in a longitudinal direction, said main body including an internal face and an external face, wherein the internal face is configured to be connectable to a structural element of the aircraft and the external face is configured to receive an electric cable; wherein said main body has a substantially convex shape on said external face;

said external face includes a repeating external pattern, said pattern including a plurality of facets, said facets are connected by convex sections, wherein a transverse section of said external face comprises said facets joined by said convex sections in an overall shape of an arc of a circle with a first set of openings separating said facets; and a plurality of main contact surfaces and openings in the external face, said contact surfaces and openings are located in a repeating pattern both longitudinally and transversely on said surface, wherein a main contact surface separates at least two openings in said external face, each of said main contact surfaces is configured to accept one electric cable adjacent said contact surface and a cable tie extends through adjacent openings to secure said cable.

* * * * *